H. S. LAND.
APPARATUS FOR TURNING, SHAPING, AND SCREW CUTTING.
APPLICATION FILED JAN. 5, 1914.

1,167,186.

Patented Jan. 4, 1916.

Witnesses

Inventor
Henry S. Land;
by
Attorney

UNITED STATES PATENT OFFICE.

HENRY STEPHEN LAND, OF COUNTY OF ESSEX, ENGLAND.

APPARATUS FOR TURNING, SHAPING, AND SCREW-CUTTING.

1,167,186.     Specification of Letters Patent.     Patented Jan. 4, 1916.

Original application filed December 31, 1912, Serial No. 739,508. Divided and this application filed January 5, 1914. Serial No. 810,470.

*To all whom it may concern:*

Be it known that I, HENRY STEPHEN LAND, a subject of the King of Great Britain, residing in Essex, England, and whose post-office address is 8 Park View, Old Road, Lee, in the county of Essex, England, have invented certain new and useful Improvements in Apparatus for Turning, Shaping, and Screw-Cutting, of which the following is a specification.

This invention which formed a part of that embodied in my co-pending patent application Serial No. 739508, relates to a lathe attachment or tool of the kind which is adapted to effect the rapid production of turned and screwed, or turned bodies of one or more diameters, from bars or rods of metal of any cross sectional outline, and comprises a device to enable apparatus of the above character to be applied to an ordinary turning lathe. According to this invention the cradle on which the tool is mounted to slide in a fore and aft direction and which is carried by the back center or mandrel of the lathe, is afforded support at its forward end by ties extending therefrom on each side to a clamp or clamps secured on the lathe mandrel.

The invention is illustrated in the accompanying drawing, wherein—

Figure 1:
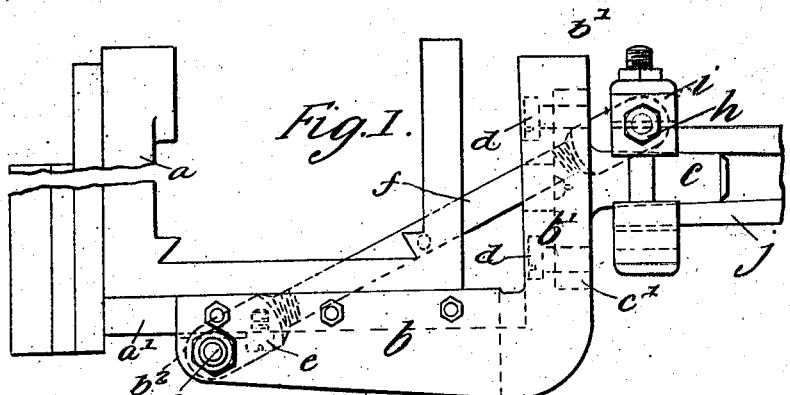
Figure 2:
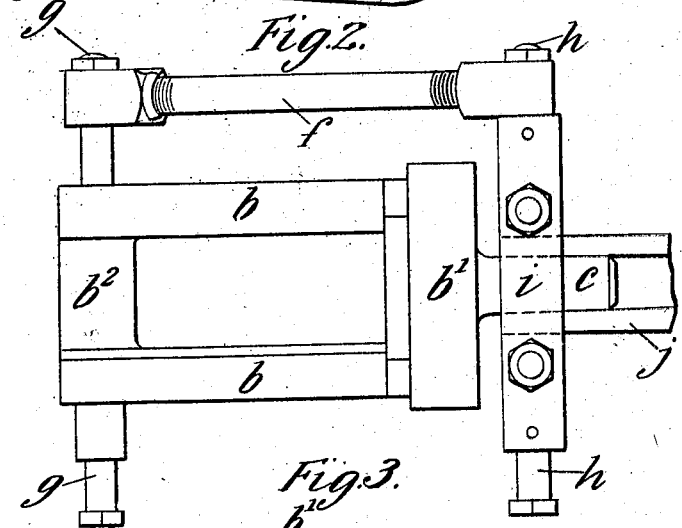

Figure 1 is a side elevation showing a tool holder mounted on a cradle attached to the puppet head of a lathe and means of support for the cradle; Fig. 2 is a plan view of the same but with the tool holder removed; and Fig. 3 is an end elevation of the cradle and parts of the supporting means shown in Fig. 1.

In these drawings $a$ represents the tool holder or slide, the base of which is dovetailed as shown at $a^1$ to slide fore and aft in the cradle $b$ which is correspondingly undercut. The end plate or bracket $b^1$ of the cradle is provided with a pin $c$ for attachment to the puppet head mandrel. This pin is made separable so that when the apparatus is supplied it can readily be adapted to a mandrel of any taper, for which purpose the pin is provided with a flange or head $c^1$ which fits in a correspondingly shaped recess in the end bracket $b^1$ of the cradle and is therein secured as by means of setscrews $d$. The pin and pin head are centered, as indicated, ready for turning the pin to the taper required for any given lathe. A stop pin $e$ is screwed into the base of the tool holder so that the head of the pin projects into the opening between the two side bars of the cradle and by engagement with the cross bar $b^2$ at the end of the cradle prevents the tool holder sliding too far out of the latter.

Figure 3:
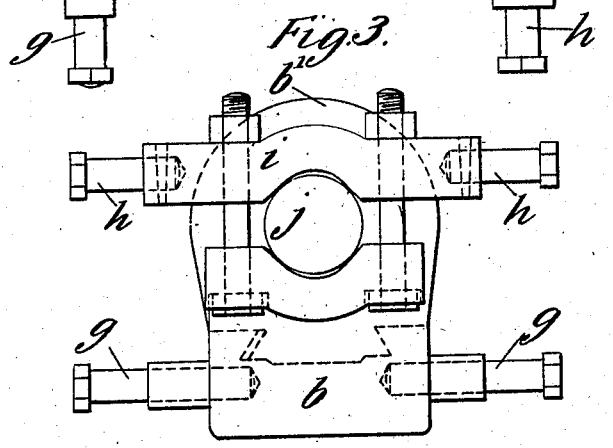

As shown in Figs. 1, 2 and 3, the forward end of the cradle is preferably supported from the puppet head of the lathe by means of ties $f$ secured at one end to pins $g$ extending laterally from the sides of the cradle at its front end, and at the other end to pins $h$ extending laterally from a clamp $i$ secured on the puppet head mandrel $j$.

Having now described the nature of my invention and the best means I know of carrying the same into practical effect, I claim:—

1. In a device of the class described, the combination of a cradle having means whereby it may be detachably supported at its rear end from the lathe puppet head and provided with a straight longitudinal slideway, a lathe tool-holder having a dependent portion formed as a counterpart of and adapted to slide to and fro rectilineally in the said slideway, means for limiting the relative movement of the cradle and tool-holder, and means for supporting the forward end of the cradle from the lathe puppet head, said means comprising a pin carried by the cradle, a pin secured to the puppet head and a rod connecting said pins.

2. In a device of the class described, the combination of a cradle having interchangeable means whereby it may be detachably supported from the lathe puppet head and provided with a straight longitudinal slideway, a lathe tool-holder having a dependent portion formed as a counterpart of and adapted to slide to and fro rectilineally in the said slideway, means for limiting the relative movement of the cradle and tool-holder, and means for supporting the cradle from the lathe, said means comprising a pin carried by the cradle, a pin secured to the lathe, and rods connecting said pins.

In testimony whereof I have signed my name to this specification in the presence of two subscribing witnesses.

HENRY STEPHEN LAND.

Witnesses:
JOSEPH MILLARD,
W. I. SKERTEN.